Tilman & Good,
Automatic Fan.

Nº 77,415. Patented Apr. 28, 1868.

Witnesses:
Wm Wansleben
U. P. Stockbridge

Inventors:
Noah H. Tilman
David Good
p. Alexander Mason
Atty

United States Patent Office.

NOAH H. TILMAN AND DAVID G. GOOD, OF ARCANUM, OHIO.

Letters Patent No. 77,415, dated April 28, 1868.

IMPROVED TABLE-FAN AND CASTER-STAND.

*The Schedule referred to in these Letters Patent and making part of the same.*

TO ALL WHOM IT MAY CONCERN:

Be it known that we, NOAH H. TILMAN and DAVID G. GOOD, of Arcanum, in the county of Darke, and in the State of Ohio, have invented certain new and useful Improvements in Automatic Fan and Caster-Stand combined; and do hereby declare that the following is a full, clear, and exact description thereof, reference being had to the accompanying drawings, and the letters of reference marked thereon.

In the annexed drawings, making a part of this specification, A represents a suitable base, and B represents a shaft or vertical standard for a caster.

C represents the rings or loops by which the bottles or vessels are suspended, and are adjusted on the shaft B, as shown.

D represents a suitable case, the base of which is secured to the top of the shaft or standard B. Inside of the case D, and secured to the base thereof, we place an ordinary clock or other suitable machinery, for the purpose of propelling the frame E, and the fans F F adjusted therein.

E represents a frame of suitable dimensions to embrace and work around the case D, and is suspended upon and operated by the vertical shaft $g$, which projects up through the top of the case D.

The lower side of the frame E is made so as to work around the shaft B, and is fastened by means of a suitable adjustable loop or hook, $h$.

Figure 1:
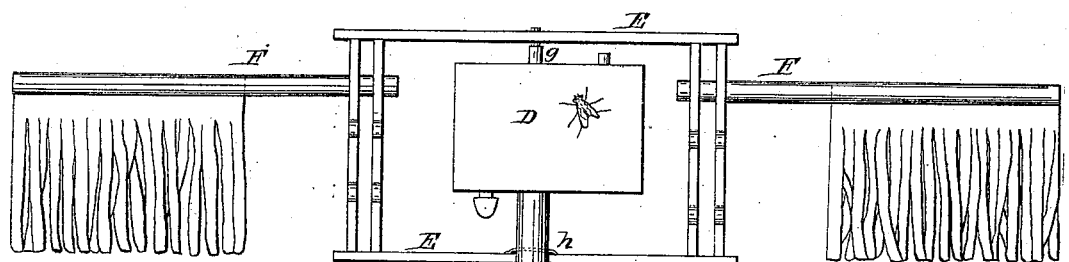
Figure 3:
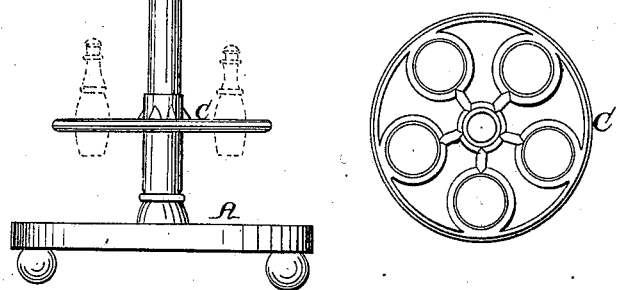
Figure 2:
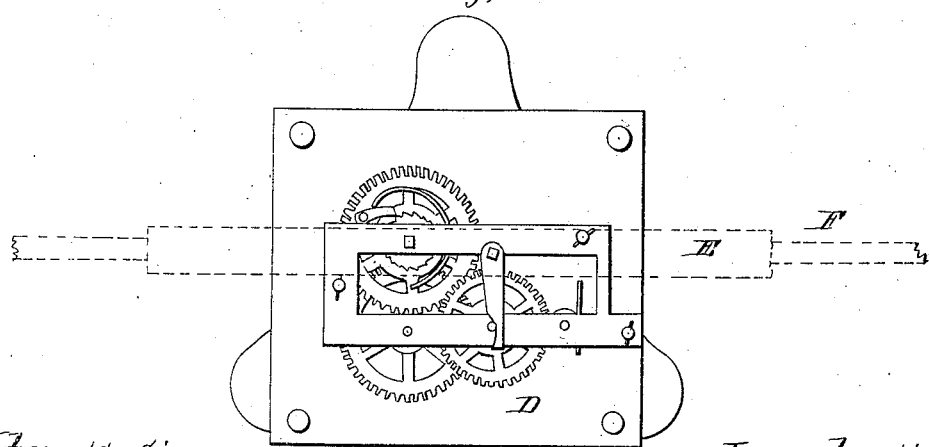

The fans F F are made in any suitable form, and of any desired material. The vertical bars of the frame E are provided with a series of perforations, as shown in dotted lines in Figure 1, so that the fans F can be adjusted to operate either high or low, to suit.

The machinery in the case D is wound up by means of a suitable key, and this sets the frame E and fans F in motion.

The advantages of this device are obvious, it being a caster and fly-fan combined, thereby occupying only the room of either when made separate.

Having thus fully described our invention, what we claim as new, and desire to secure by Letters Patent, is—

The arrangement of the frame E outside of the box D, and the stationary caster-standard B, said frame being perforated as described, whereby the fans F F may be adjusted to operate as herein specified.

In testimony that we claim the foregoing, we have hereunto set our hands and seals, this 26th day of February, 1868.

NOAH H. TILMAN. [L. S.]
DAVID G. GOOD. [L. S.]

Witnesses:
W. E. BRITTON,
IRVIN MOTE.